(12) United States Patent
Hayes et al.

(10) Patent No.: US 11,900,381 B2
(45) Date of Patent: Feb. 13, 2024

(54) MISSING ENTITY ALERT AND RETRIEVAL

(71) Applicant: MASTERCARD INTERNATIONAL INCORPORATED, Purchase, NY (US)

(72) Inventors: Joseph Hayes, Montclair, NJ (US); Marek Kurylko, Bloomfield, NJ (US); Eugene Reda, Little Falls, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 634 days.

(21) Appl. No.: 16/793,975

(22) Filed: Feb. 18, 2020

(65) Prior Publication Data

US 2021/0256525 A1 Aug. 19, 2021

(51) Int. Cl.
*G06Q 20/40* (2012.01)
*G06F 9/54* (2006.01)
*G06Q 20/20* (2012.01)
*H04L 51/224* (2022.01)

(52) U.S. Cl.
CPC ......... *G06Q 20/4016* (2013.01); *G06F 9/542* (2013.01); *G06Q 20/20* (2013.01); *H04L 51/224* (2022.05)

(58) Field of Classification Search
CPC .. G06Q 20/4016; G06Q 20/20; H04L 51/224; G06F 9/542
See application file for complete search history.

(56) References Cited

U.S. PATENT DOCUMENTS

| | | | |
|---|---|---|---|
| 4,650,219 A | 3/1987 | Sigman | |
| 6,064,307 A | 5/2000 | Silver | |
| 2006/0265298 A1* | 11/2006 | Lee | G06Q 10/00 707/999.1 |
| 2012/0226751 A1 | 9/2012 | Schwaderer | |
| 2016/0239733 A1* | 8/2016 | Hertz | H04W 4/029 |

(Continued)

FOREIGN PATENT DOCUMENTS

| | | |
|---|---|---|
| AU | 2013100767 A4 | 7/2013 |
| FR | 2713371 A1 | 6/1995 |
| JP | 2005-157600 A | 6/2005 |

(Continued)

*Primary Examiner* — A. Hunter Wilder
*Assistant Examiner* — Joseph M Mutschler
(74) *Attorney, Agent, or Firm* — Talem IP Law, LLP

(57) ABSTRACT

Through a missing entity process any point of sale (POS) terminal can be used to help a missing entity contact find a missing entity. A missing entity system can receive a request that includes at least missing entity account information and merchant information as transmitted from the POS terminal. The request may be a missing entity service request (an API call) requesting a missing entity alert or a conventional transaction request, such as an authorization request or a preauthorization request. Upon receipt of the request, the missing entity system can obtain contact information for a missing entity contact associated with the missing entity account information and communicate, via a messaging application, the missing entity alert to the missing entity contact using the obtained contact information. The missing entity alert notifies the missing entity contact of the location of the missing entity as indicated by the merchant information.

19 Claims, 11 Drawing Sheets

(56) References Cited

U.S. PATENT DOCUMENTS

2016/0378877 A1    12/2016   Khemka

FOREIGN PATENT DOCUMENTS

| | | |
|---|---|---|
| JP | 2018-142089 A | 9/2018 |
| KR | 10-2008-0080423 A | 9/2008 |
| WO | 94/27230 A1 | 11/1994 |
| WO | 2017/130226 A1 | 8/2017 |

* cited by examiner

MISSING ENTITY ALERT AND RETRIEVAL

BACKGROUND

Entities such as people, including adults with dementia and children, animals, and things, may find themselves lost without being able to easily communicate where they are or need to be or who is caring for them. Current safety techniques include identification bracelets, tags, stickers, and even implantable chips for pets. Usually, when a person finds the lost or missing entity, the missing entity either needs to have the contact information written on them or the finder needs to take the missing entity to a specific location that has a specialized reader to read the contact information from the identification.

BRIEF SUMMARY

Techniques and systems for missing entity alert and retrieval are provided. Through a missing entity alert and retrieval process ("missing entity process") any point-of-sale (POS) terminal, including near field communication (NFC) supported terminals, can be used to help a missing entity contact (e.g., a parent) find a missing entity (e.g., a child).

During an example of the missing entity process, a payment network having a missing entity alert and retrieval platform ("missing entity platform") can receiving transaction information that includes account information and merchant information. The transaction information can be received from a merchant via any POS terminal or closed loop NFC device. The payment network having the missing entity platform can determine if the account information is missing entity account information. In response to determining the account information is the missing entity account information, the payment network having the missing entity platform can communicate a missing entity service request to request a missing entity alert. The missing entity service request can be an API call that includes the missing entity account information and the merchant information.

A missing entity alert and retrieval system ("missing entity system") can receive a request that includes at least missing entity account information and merchant information. In some cases, the request can be a missing entity service request requesting a missing entity alert. The missing entity service request is an API call that includes the missing entity account information and the merchant information. In some cases, instead of a missing entity service request, the request can be a conventional transaction request, such as an authorization request or a preauthorization request. The missing entity system can obtain contact information for a missing entity contact associated with the missing entity account information and communicate, via a messaging application, the missing entity alert to the missing entity contact using the obtained contact information.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
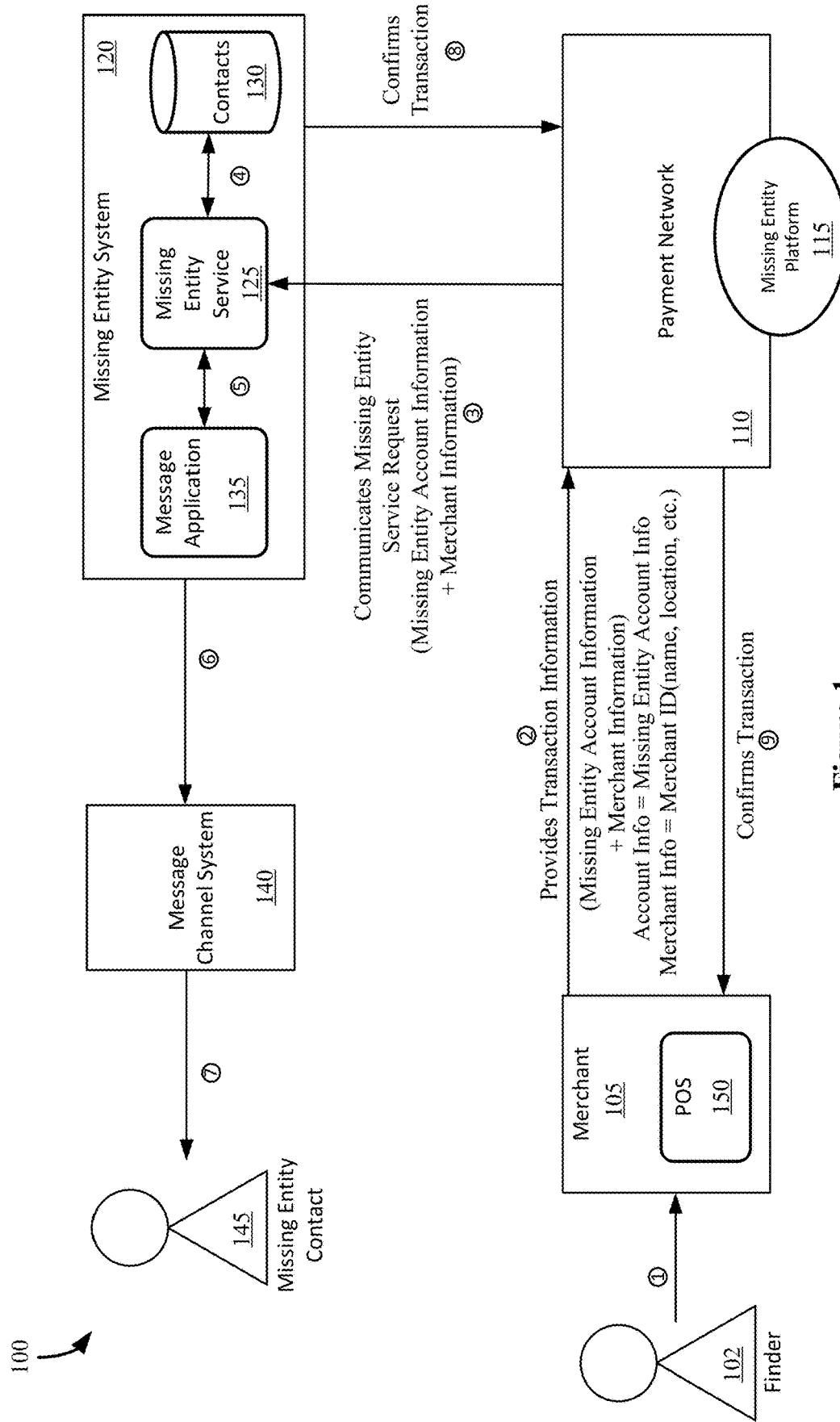
FIG. 1 illustrates an example operating environment and signal flow in which various embodiments of the invention may be carried out.

Techniques and systems for missing entity alert and retrieval are provided. Through a missing entity alert and retrieval process ("missing entity process") any POS terminal, including NFC-supported terminals, can be used to help a missing entity contact (e.g., a parent) find a missing entity (e.g., a child).

The missing entity can be an object, a person, or an animal. For example, the missing entity may be luggage, a wallet, a purse, a pet, a child, or a person with disabilities. The finder can be a person who finds the missing entity.

The missing entity contact can be an owner, parent, or guardian of the missing entity. The missing entity contact can create a missing entity alert and retrieval account ("missing entity account") and register the missing entity with an issuer offering missing entity alert and retrieval.

Advantageously, a finder of a missing entity having a missing entity card may bring the missing entity card to any merchant to initiate the missing entity process. During the missing entity process, a missing entity alert notifies the missing entity contact that the missing entity has been found, as well as the location of where the missing entity can be retrieved. In this manner, the person who is the missing entity contact can be reunited with their missing entity.

As an illustrative example, a parent can enroll his/her child for a missing entity card, which can be affixed to pockets, shoes, or clothing. If the child gets lost, a helping adult can insert missing entity card into any card-enabled POS device (or tap or wave the card on or over a contactless payment-enabled POS device) to initiate the missing entity process. The payment network can immediately locate the merchant and notify the issuer of the missing entity card. The issuer of the missing entity card can then contact the parent, tell him/her the address of the merchant where the child is located, and, depending on implementation, ask if police should be notified.

In some cases, the "issuer" of the missing entity card is a bank or other institution that provides payment cards to the cardholder. The issuer (whether a conventional issuer or a company that only issues missing entity cards) issues a missing entity alert and retrieval card ("missing entity card") for the missing entity. The missing entity card can be issued with or without payment capabilities. In some cases, missing entity capabilities can be activated for payment cards. In some of such cases, the missing entity contact may be able to activate a missing entity mode (which can in some cases deactivate the payment capabilities) via the missing entity's online banking application or website at the time they recognize their child or other entity is lost. This activation can enable real-time updates to contact information of the missing entity contact.

The missing entity card may be a physical card (with or without NFC capabilities) or a computing device (e.g., with an electronic wallet). In the case where the missing entity card is a physical card, the missing entity card can be, for example, configured to be affixed to a pet collar, luggage, or a child's shoe. In the case where the missing entity card is a computing device, the missing entity card may be digitized in a payment enabled wearable device, such as a smart watch. Additional information on the missing entity enrollment process will be provided in a later discussion.

Figures 2A, 2B:
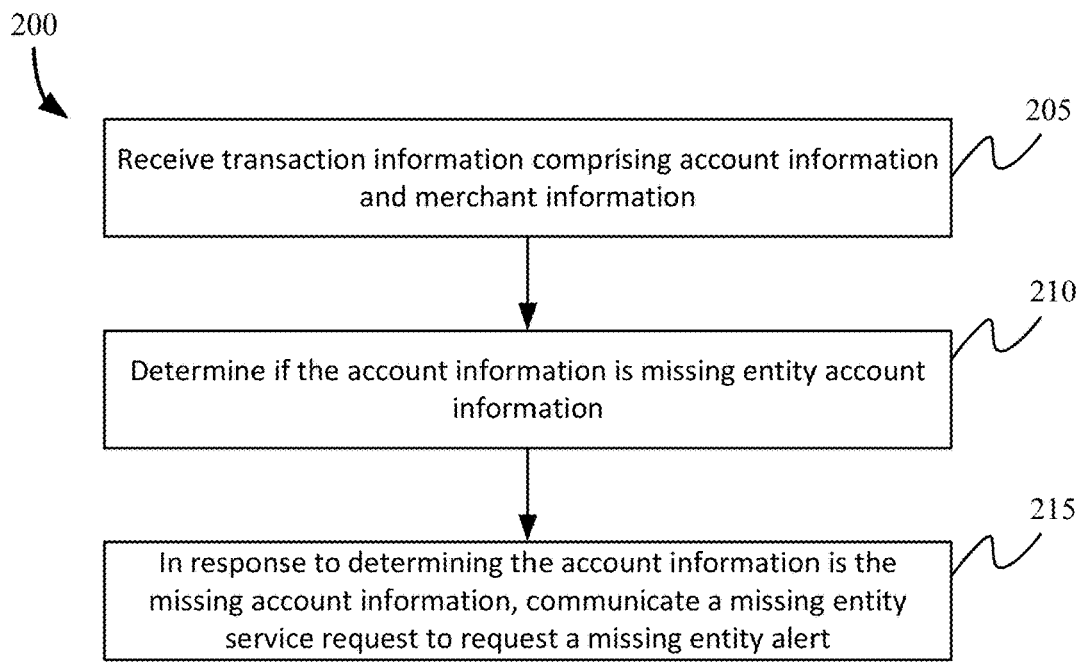
FIGS. 2A and 2B illustrate example process flows for providing missing entity alert and retrieval that may be implemented in the operating environment of FIG. 1.
Figure 3:
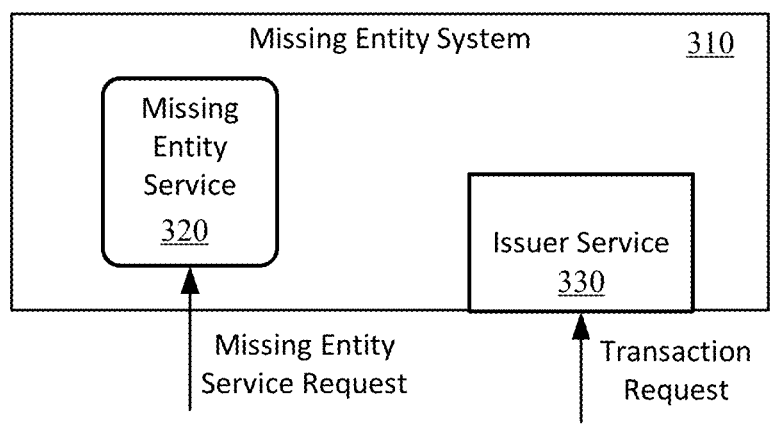
FIG. 3 illustrates an example missing entity system that may be implemented in the operating environment of FIG. 1.

FIG. 1 illustrates an example operating environment and signal flow in which various embodiments of the invention may be carried out; FIGS. 2A and 2B illustrate example process flows for providing missing entity alert and retrieval that may be implemented in the operating environment of FIG. 1; and FIG. 3 illustrates an example missing entity system that may be implemented in the operating environment of FIG. 1.

Referring to FIG. 1, an operating environment 100 can include a finder 102, a merchant 105, a payment network 110 having a missing entity platform 115, a missing entity system 120, a missing entity service 125, a contacts data resource 130, a message application 135, a message channel system 140, and a missing entity contact 145.

Figure 11:
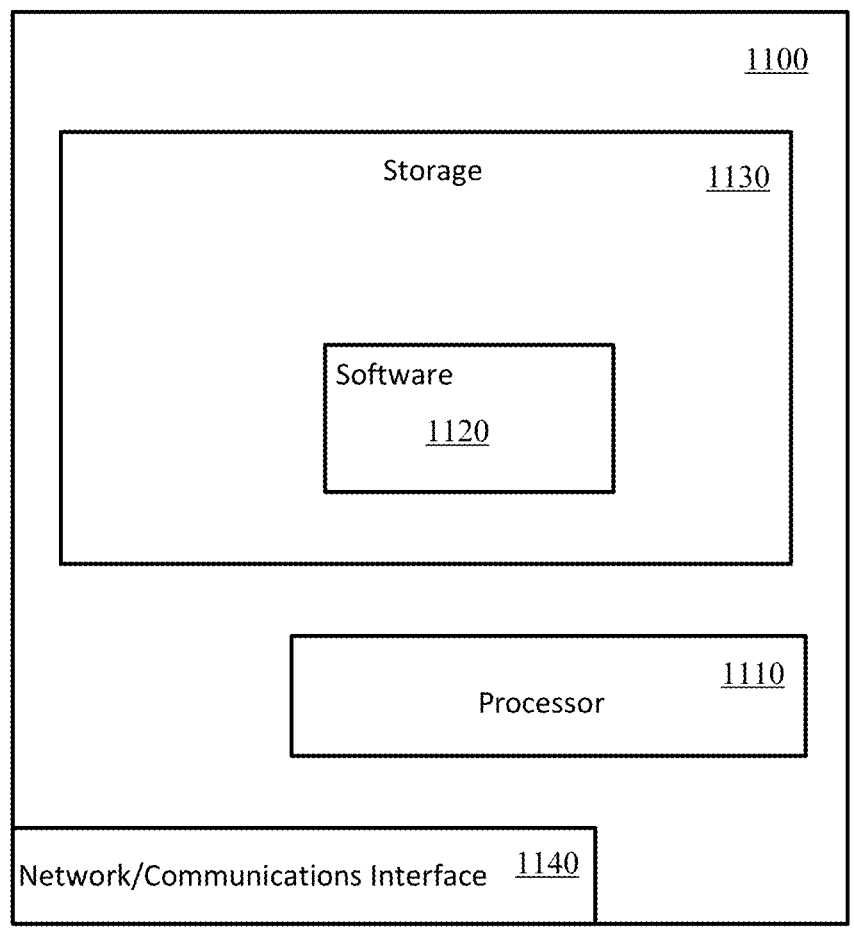
FIG. 11 illustrates components of a computing system that may be used in certain embodiments described herein.

The payment network 110 and missing entity platform 115, performing process 200 of FIG. 2A, can be embodied as described with respect to computing system 1100 shown in FIG. 11. The missing entity system 120, performing process 250 of FIG. 2B can be embodied as described with respect to computing system 1100 shown in FIG. 11.

A missing entity alert and retrieval process is initiated when the finder 102 presents a missing entity card to the merchant 105, as shown in Step 1. In an example where a child is lost and has a missing entity card affixed to their shoe, when a person finds the child the person can take the child and the missing entity card to any merchant and ask the merchant to initiate the missing entity process.

In some cases, the finder 102 is the missing entity. For example, if a child is lost, the child may present the missing entity card to any merchant in order to initiate the missing entity process.

The missing entity card can be used to initiate a transaction at the merchant 105 via any point-of-sale (POS) device, such as POS terminal 150. For example, the missing entity card can be inserted into a chip reader of POS terminal 150 or can communicate via NFC with POS terminal 150 to cause an online authorization for the missing entity alert.

The POS terminal 150 can extract account information from the missing entity card and can generate a transaction message with the account information and merchant information. In this case, the account information is missing account information and the merchant information includes a merchant ID, such as name and location of the merchant 105. This information can be provided to the payment network 110, as shown in Step 2.

A "merchant" refers to a provider of goods or services in exchange for payment. The transaction that causes the online authorization for the missing entity alert may include, but is not limited to, a payment transaction, a $1 pre-authorization transaction, or a missing entity transaction (i.e., a specific transaction that indicates at the terminal that the transaction is for the missing entity alert). The transaction information sent as part of the online authorization includes at least the missing entity account information and the merchant information. The missing entity account information may include, for example, an account number or a name for the missing entity. The merchant information may include, for example, a merchant name, location, and contact information for the merchant.

Referring to FIG. 1 and FIG. 2A, the payment network 110 can receive (205) transaction information comprising account information and merchant information. The payment network 110 can receive the transaction information from the merchant 105 via a payment gateway (e.g., the point-of-sale (POS) terminal 150). A "payment network" refers to a network that routes transaction information to the appropriate issuer. An example of a payment network is the one operated by Mastercard International Incorporated.

In a conventional payment card process, a payment network can identify an issuing bank, or issuer, of the customer's form of payment. When the payment network identifies the issuer, the payment network can send a transaction request with some of the payment information and request authorization and/or preauthorization on the payment method.

Here, by including the missing entity platform 115, the payment network 110 can identify the transaction as a missing entity transaction. The payment network 110 can determine (210) if the account information received in the transaction message is missing entity account information. Through the missing entity platform 115, the payment network 110 can identify that the account information received with the transaction information is missing entity account information. For example, the missing entity platform 115 of the payment network 110 can identify that a payment authorization is on a missing entity account.

The missing entity platform 115 recognizes the account information as belonging to a missing entity system (e.g., by the account number or by having a registry) and that the transaction is a missing entity transaction. For example, the missing entity platform 115 may recognize the transaction as a missing entity transaction by the particular transaction (e.g., $1 pre-authorization).

In response to determining (210) the account information is the missing entity account information, the payment network 110 can communicate (215) a missing entity service request to the missing entity system 120 to request a missing entity alert. Indeed, when the missing entity platform 115 determines that the account information received at the transaction information is missing account information, the payment network 110 can communicate a missing entity service request requesting a missing entity alert instead of communicating a conventional transaction request, such as an authorization request or preauthorization request.

The payment network 110 can communicate the missing entity service request requesting a missing entity alert to the missing entity service 125 of the missing entity system 120 as shown in Step 3. The missing entity service request is a request for a missing entity alert. The missing entity service request can be an API call comprising at least the missing entity account information and the merchant information.

An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component. The API is generally a set of programming instructions and standards for enabling two or more applications to communicate with each other and is commonly implemented over the Internet as a set of Hypertext Transfer Protocol (HTTP) request messages and a specified format or structure for response messages according to a REST (Representational state transfer) or SOAP (Simple Object Access Protocol) architecture.

Referring to FIGS. 1 and 2B, the missing entity service 125 can receive (255) the missing entity service request requesting a missing entity alert. As previously described, the missing entity service request can be an API call and can include missing entity account information and merchant information.

When the missing entity service 125 receives (255) the missing entity request, the missing entity service 125 can obtain (260) contact information for a missing entity contact (e.g., the missing entity contact 145) associated with the missing entity account information.

In some cases, the missing entity service 125 can communicate with the contacts data resource 130 to obtain the contact information for the missing entity contact associated with the missing entity account information, as shown in Step 4. The contacts data resource 130 can include contact information associated with each of a plurality of missing entity accounts. The contact information can include, but is not limited to, information about a missing entity contact (e.g., the missing entity contact 145), such as a name, an email address, and a phone number, as well as information about the missing entity, such as a name. The contact information includes information needed to notify the missing entity contact 145 of the missing entity alert.

Once the missing entity service 125 obtains the contact information for the missing entity contact 145 associated with the missing entity account, the missing entity service 125 can communicate with the message application 135, as shown in Step 5. In Step 5, the missing entity service 125 can provide the message application 135 with at least the contact information for the missing entity contact and the merchant information. In some cases, the missing entity service 125 also provides the missing entity account information.

The missing entity system 120 can communicate (265) the missing entity alert to the missing entity contact 145 using the obtained contact information via the message application 135 and the message channel system 140, as shown in Step 6 and Step 7.

For example, as shown in Step 6, the missing entity system 120 can communicate the contact information, the merchant information, and optionally the missing entity account information to the message channel system 140 via the message application 135.

As shown in Step 7, once the message channel system 140 receives the contact information, the merchant information, and optionally the missing entity account information, the message channel system 140 can package the merchant information into a message to send the missing entity contact 145.

The message application 135 and the message channel system 140 may be any suitable message application and message communication channel, including but not limited to, a phone application (e.g., telephony or voice over Internet protocol (VoIP)) and voice/text server, simple messaging service (SMS) and SMS gateway, multimedia messaging service (MMS) and MMS gateway, an instant messaging application and instant messaging service, or email and email server(s).

For example, a voice/text server may be provided to receive voice, text, or multimedia messages containing the missing entity alert and transfer the message to the missing entity contact 145. For example, the message application 135 may enable the missing entity alert to be routed via a voice/text server to a phone (such as a land-line, cell phone, or smart phone) for the missing entity contact 145. In some cases, a cell tower or traditional telephony infrastructure may be part of the message channel system 140. In some cases, the voice and/or text may be transmitted over Wi-Fi to a network such as the Internet (for example via VoIP).

As another example, an email application may be used to send an email message containing the missing entity alert over a network to an email address of the missing entity contact 145 via an email server.

As yet another example, an instant messaging application and instant messaging service (such as a mobile instant messaging or embedded web browser service) may be used where the "person" being chatted with is the missing entity contact 145 that receives the message containing the missing entity alert.

After receiving the missing entity service request in Step 3, the missing entity system 120 can forward a signal of success or failure back to the payment network 110, as shown in Step 8. Once the signal is received, the payment network 110 can forward the signal to the merchant, as shown in Step 9. In some cases, a "transaction confirmation" (e.g., the signal of success or failure) is sent by the missing entity system 120 after sending the alert to the missing entity contact 145.

Referring to FIG. 3, in an operating environment where a payment network includes a smart entity platform (e.g., operating environment 100 shown in FIG. 1), a missing entity system 310 may handle payment transactions in addition to a missing entity alert and retrieval process. Here, the missing entity system 310 includes a missing entity service 320 and an issuer service 330.

The missing entity service 320 can receive a missing entity service request from a payment network. As previously described, the missing entity service request can be an API call comprising missing entity account information and merchant information. Once the missing entity service request is received, the missing entity system 310 can perform steps of a missing entity process (e.g., step 260 and 265 of process 250 as described with respect to FIG. 2B).

The issuer service 330 can receive a transaction request from a payment network. The transaction request may be an authorization request or a pre-authorization request and can include the missing entity account number, which also functions as a payment account number for such an implementation. Once the transaction request is received, the missing entity system 310 can perform appropriate steps of a conventional payment process.

Figure 4:
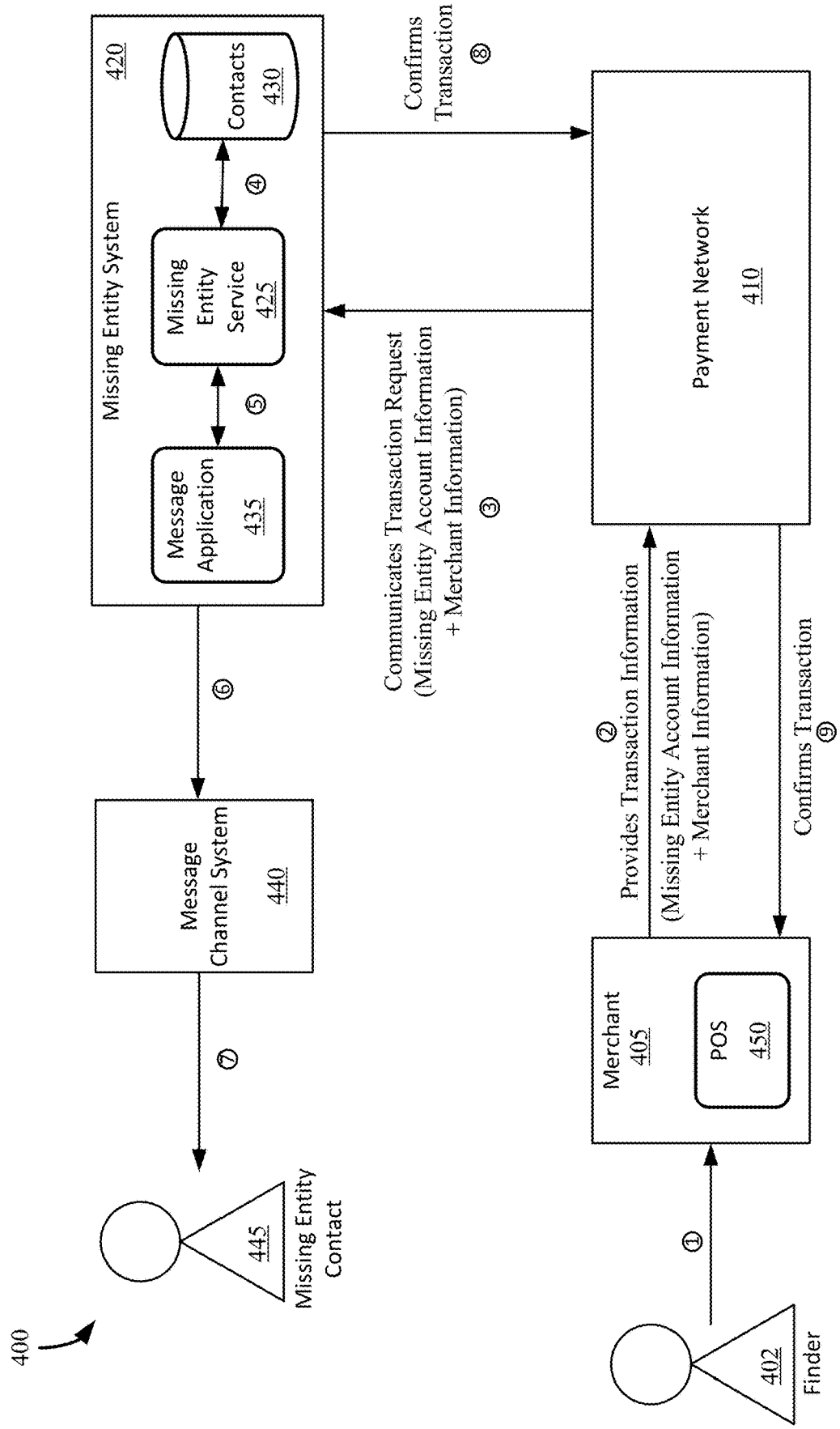
FIG. 4 illustrates an example operating environment and signal flow in which various embodiments of the invention may be carried out.
Figure 5B:
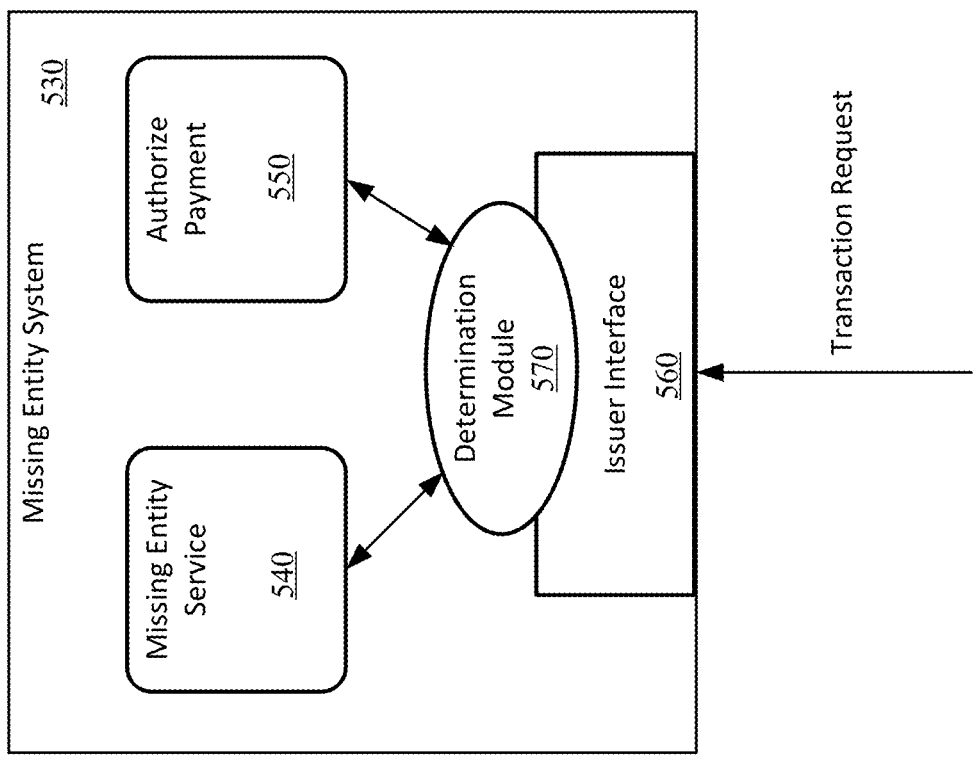
FIGS. 5A and 5B illustrate example missing entity systems that may be implemented in the operating environment of FIG. 4.
Figure 5A:
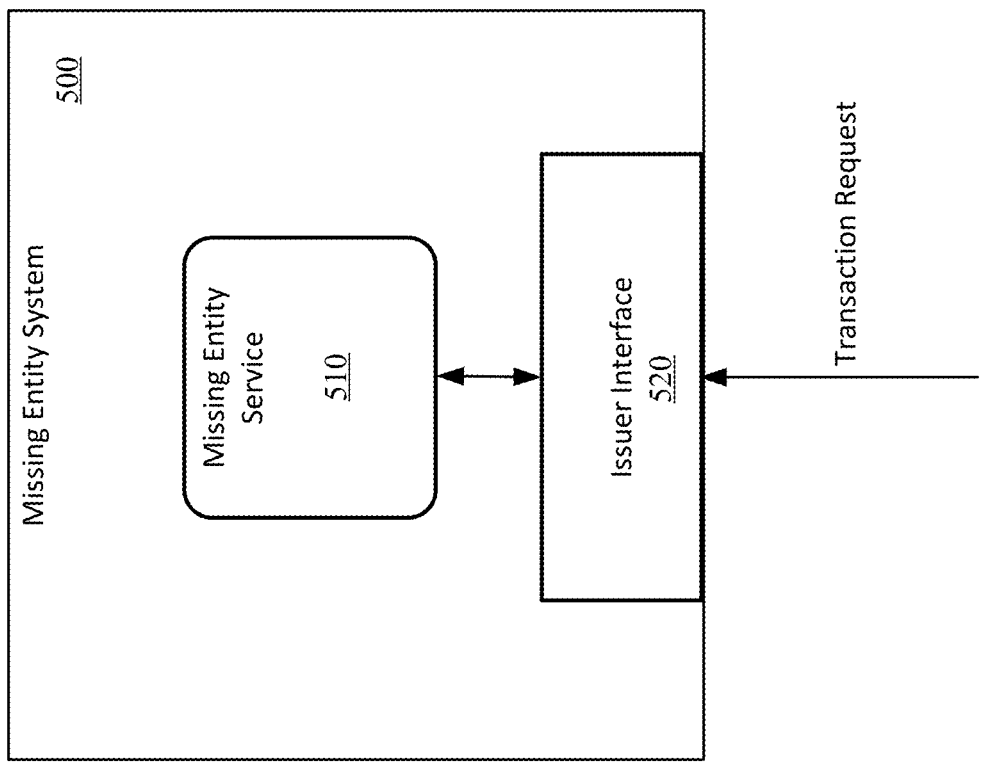
Figure 5C:
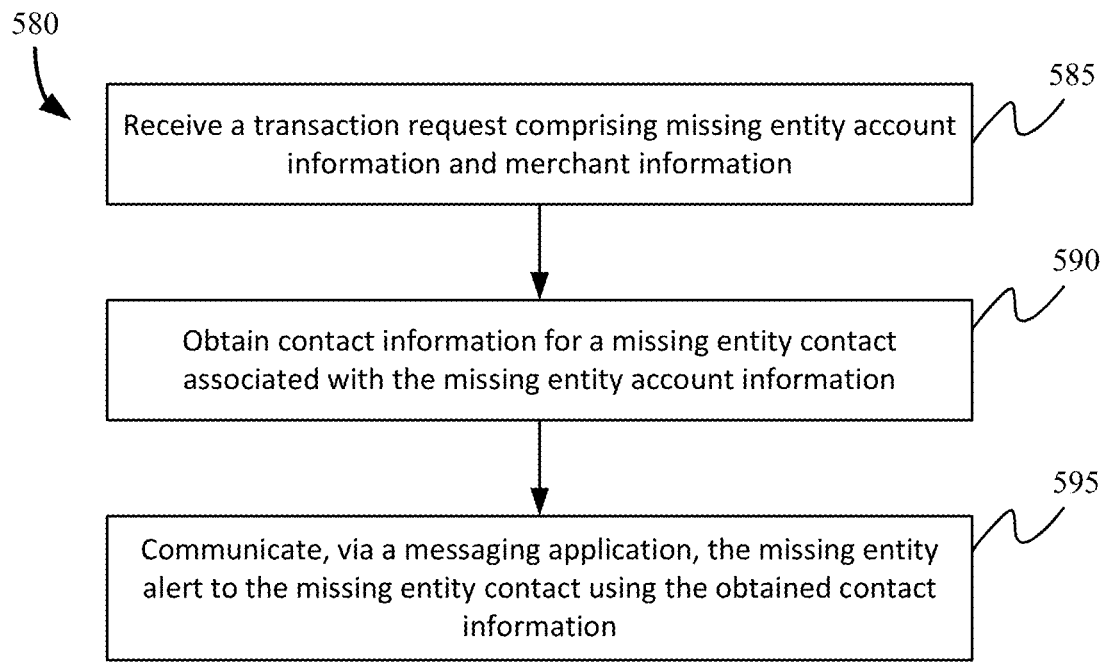
FIG. 5C illustrates an example process flow for providing missing entity alert and retrieval that may be implemented in the operating environment of FIG. 4.

FIG. 4 illustrates an example operating environment and signal flow in which various embodiments of the invention may be carried out; FIGS. 5A and 5B illustrate example missing entity systems that may be implemented in the operating environment of FIG. 4; and FIG. 5C illustrates an example process flow for providing missing entity alert and retrieval that may be implemented in the operating environment of FIG. 4.

Referring to FIG. 4, an operating environment 400 can include a finder 402, a merchant 405, a payment network 410, a missing entity system 420, a missing entity service 425, a contacts data resource 430, a message application 435, a message channel system 440, and a missing entity contact 445.

Here, the payment network 410 is a conventional payment network and can be embodied as described with respect to computing system 1100 shown in FIG. 11. The missing entity system 420 can be embodied as described with respect to computing system 1100 shown in FIG. 11.

A missing entity alert and retrieval process is initiated when the finder 402 presents a missing entity card to the merchant 405, as shown in Step 1. In an example where a child is lost and has a missing entity card affixed to their shoe, when a person finds the child the person can take the child and the missing entity card to any merchant and ask the merchant to initiate a transaction.

In some cases, the finder 402 is the missing entity. For example, if a child is lost, the child may present the missing entity card to any merchant in order to initiate the transaction.

The missing entity card can be used to initiate the transaction at the merchant 405 via any point-of-sale (POS) device, such as POS terminal 450. For example, the missing entity card can be inserted into a chip reader of POS terminal 450 or can communicate via NFC with POS terminal 450 to cause an online authorization for the missing entity alert. Similar to the implementation described with respect to FIG. 1, the transaction that causes the online authorization may include any suitable transaction such as, but not limited to, a payment transaction or a $1 pre-authorization transaction.

The POS terminal 450 can extract missing entity account information from the missing entity card and can generate a transaction message with the account information and merchant information, such as name and location of the merchant 405. This information can be provided to the payment network 410, as shown in Step 2.

The payment network 410 can receive the transaction information comprising the missing account information and merchant information. The payment network 410 can receive the transaction information from the merchant 405 via a payment gateway (e.g., the point-of-sale (POS) terminal 450).

The payment network 410 identifies the missing entity system 420 as the issuer in which to send the transaction request. Since the payment network 410 is a conventional payment network and does not include a missing entity platform (unlike payment network 110 and missing entity platform 115 shown in FIG. 1), the payment network 410 communicates a transaction request to the missing entity system 420 in a similar manner as the payment network 410 would communicate to any issuer. For example, as shown in Step 3, the payment network 410 can communicate the transaction request to the missing entity system 420. The transaction request can include an authorization request or pre-authorization request. The transaction request can include the missing account information and the merchant information received with the transaction information. The payment network 410 does not have to recognize the transaction information as being for a missing entity transaction. Instead, the payment network 410 treats the missing entity system 420 as any other issuer. Here, the missing entity system 420 is configured to appear to the payment network 410 as an issuer system, examples of which are shown in FIGS. 5A and 5B.

Referring to FIG. 4 and FIG. 5C, the missing entity system 420, performing process 580, can receive (585) a transaction request. When the missing entity system 420 receives the transaction request, the missing entity service 425 can obtain (590) contact information for a missing entity contact (e.g., the missing entity contact 445) associated with the missing entity account information.

In some cases, the missing entity service 425 can communicate with the contacts data resource 430 to obtain the contact information for the missing entity contact associated with the missing entity account information, as shown in Step 4. The contacts data resource 430 can include contact information associated with each of a plurality of missing entity accounts. The contact information can include, but is not limited to, information about a missing entity contact (e.g., the missing entity contact 445), such as a name, an email address, and a phone number, as well as information about the missing entity, such as a name. The contact information includes information needed to notify the missing entity contact 445 of the missing entity alert.

Once the missing entity service 425 obtains the contact information for the missing entity contact 445 associated with the missing entity account, the missing entity service 425 can communicate with the message application 435, as shown in Step 5. In Step 5, the missing entity service 425 can provide the message application 435 with at least the contact information for the missing entity contact and the merchant information. In some cases, the missing entity service 425 also provides the missing entity account information.

The missing entity system 420 can communicate (595) the missing entity alert to the missing entity contact 445 using the obtained contact information via the message application 435 and the message channel system 440, as shown in Step 6 and Step 7.

For example, as shown in Step 6, the missing entity system 420 can communicate the contact information, the merchant information, and optionally the missing entity account information to the message channel system 440 via the message application 435.

As shown in Step 7, once the message channel system 440 receives the contact information, the merchant information, and optionally the missing entity account information, the message channel system 440 can package the merchant information into a message to send the missing entity contact 445.

Similar to that described with respect to FIG. 1, the message application 435 and the message channel system 440 may be any suitable message application and message communication channel, including but not limited to, a phone application (e.g., telephony or voice over Internet protocol (VoIP)) and voice/text server, simple messaging service (SMS) and SMS gateway, multimedia messaging service (MMS) and MMS gateway, or email and email server(s).

As mentioned above, a missing entity system (e.g., missing entity system 500 and missing entity system 530 of FIGS. 5A and 5B) can hold itself out as an issuer system in an operating environment with a conventional payment network, such as operating environment 400 shown in FIG. 4.

Referring to FIG. 5A, in some cases, missing entity system 500 includes functionality to handle a missing entity process. Here, the missing entity system 500 includes a missing entity service 510 and an issuer interface 520.

The issuer interface 520 can receive a transaction request from a payment network. The transaction request may be a conventional transaction request to an issuer such as an authorization request or a pre-authorization request and can include the missing entity account number. Once the transaction request is received, the issuer interface 520 can communicate the transaction request to the missing entity service 510.

In some cases, the issuer interface 520 can transform the transaction request to a missing entity service request and then communicate the missing entity service request to the missing entity service 510.

Once the missing entity service 510 receives the transaction request, the missing entity system 310 can perform steps of a missing entity process (e.g., step 590 and 595 of process 580 as described with respect to FIG. 5C).

Referring to FIG. 5B, in some cases, missing entity system 530 includes functionality to handle the missing entity process as well as payment transactions. Here, the missing entity system 530 includes a missing entity service 540, an authorize payment module 550, an issuer interface 560, and a determination module 570.

The issuer interface 560 can receive a transaction request from a payment network. The transaction request may be a conventional transaction request to an issuer such as an authorization request or a pre-authorization request and can include the missing entity account number, which also functions as a payment account number for such an implementation.

The issuer interface 560 can send the transaction request to or initiates the code for the determination module 570, which directs the transaction request to the authorize payment module 550 or the missing entity service 540. In some cases, the determination module 570 can determine where to direct the transaction request based on account information and transaction type.

The determination module 570 can direct the transaction request to the missing entity service 540 when the determination module 570 recognizes the account information as belonging to a missing entity system (e.g., by the account number, such as a certain sequence of numbers, or by having a registry that can be used to lookup the accounts associated with a missing entity service) and that the transaction is a missing entity transaction. For example, the determination module 570 may recognize the transaction as a missing entity transaction by the particular transaction (e.g., $1 pre-authorization).

As another example, the determination module 570 may recognize the transaction as a missing entity transaction when the determination module 570 identifies that the missing account number is not associated with payment capabilities.

In some cases, the determination module 570 can transform the transaction request to a missing entity service request and then communicate the missing entity service request to the missing entity service 540.

If the missing entity service 540 receives the transaction request from the determination module 570, the missing entity system 530 (e.g., via the missing entity service 540) can perform steps of a missing entity process (e.g., steps 590 and 595 of process 580 as described with respect to FIG. 5C).

If the authorize payment module 550 receives the transaction request from the determination module 570, the missing entity system 530 (e.g., via the authorize payment module 550) can perform appropriate steps of a conventional payment process.

As illustrated by the various operating environments in which a missing entity system may operate, the missing entity system can provide missing entity alert and retrieval in response to numerous types of requests, depending on the implementation.

Figure 6:
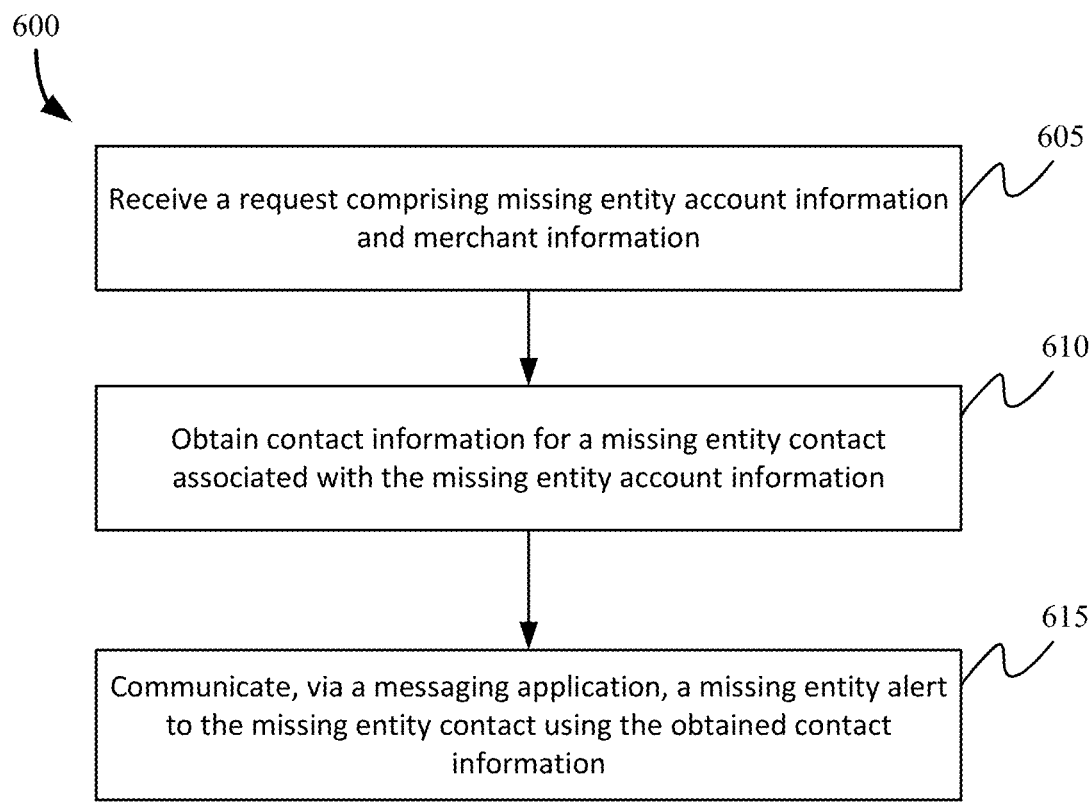
FIG. 6 illustrates an example process flow for providing missing entity alert and retrieval according to various embodiments of the invention.

FIG. 6 illustrates an example process flow for providing missing entity alert and retrieval according to various embodiments of the invention. Referring to FIG. 6, a missing entity system, performing process 600, can be embodied as described with respect to computing system 1100 shown in FIG. 11. The missing entity system can perform process 600 in any suitable operating environment (e.g., operating environment 100 and operating environment 400).

The missing entity system can receive (605) a request. The request can include at least missing entity account information and merchant information. The request may be received from a payment network, such as a conventional payment network or a payment network with a missing entity platform.

In cases where the payment network is a conventional payment network, the missing entity system may be similar to missing entity system 500 described with respect to FIG. 5A or missing entity system 530 described with respect to FIG. 5B. In these cases, the request may be a transaction request, such as an authorization request or a preauthorization request.

In cases where the payment network is a payment network with a missing entity platform, the missing entity system may be similar to missing entity system 310 described with respect to FIG. 3. In these cases, the request may be a missing entity service request requesting a missing entity alert. As previously described, the missing entity service request can be an API call and can include missing entity account information and merchant information.

Once the request is received (605), the missing entity system can obtain (610) contact information for a missing entity contact associated with the missing entity account information.

In some cases, the missing entity system can communicate with the contacts data resource, via a missing entity service, to obtain the contact information for the missing entity contact associated with the missing entity account information. As previously described, the contacts data resource can include contact information associated with each of a plurality of missing entity accounts. The contact information can include, but is not limited to, information about a missing entity contact, such as a name, an email address, and a phone number, as well as information about the missing entity, such as a name.

Once the missing entity system obtains (610) the contact information for the missing entity contact associated with the missing entity account, missing entity system can communicate (615), via a messaging application, the missing entity alert to the missing entity contact using the obtained contact information.

As an example, the missing entity system can provide a message application with at least the contact information for the missing entity contact and the merchant information.

In another example, the missing entity system can communicate the contact information, the merchant information, and optionally the missing entity account information to a message channel system via the message application.

Figure 7:
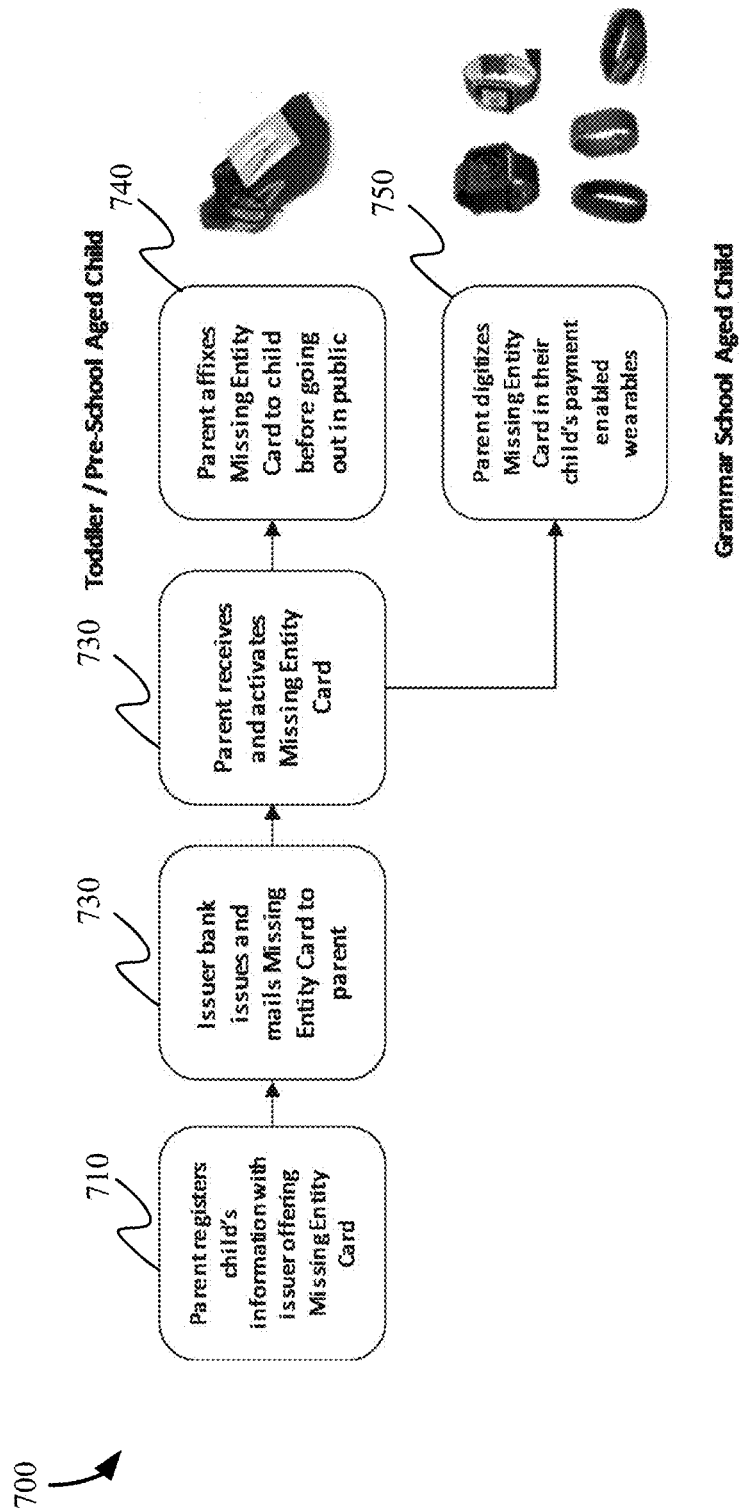
FIG. 7 illustrates an example missing entity enrollment process according to an embodiment of the invention.
Figure 8:
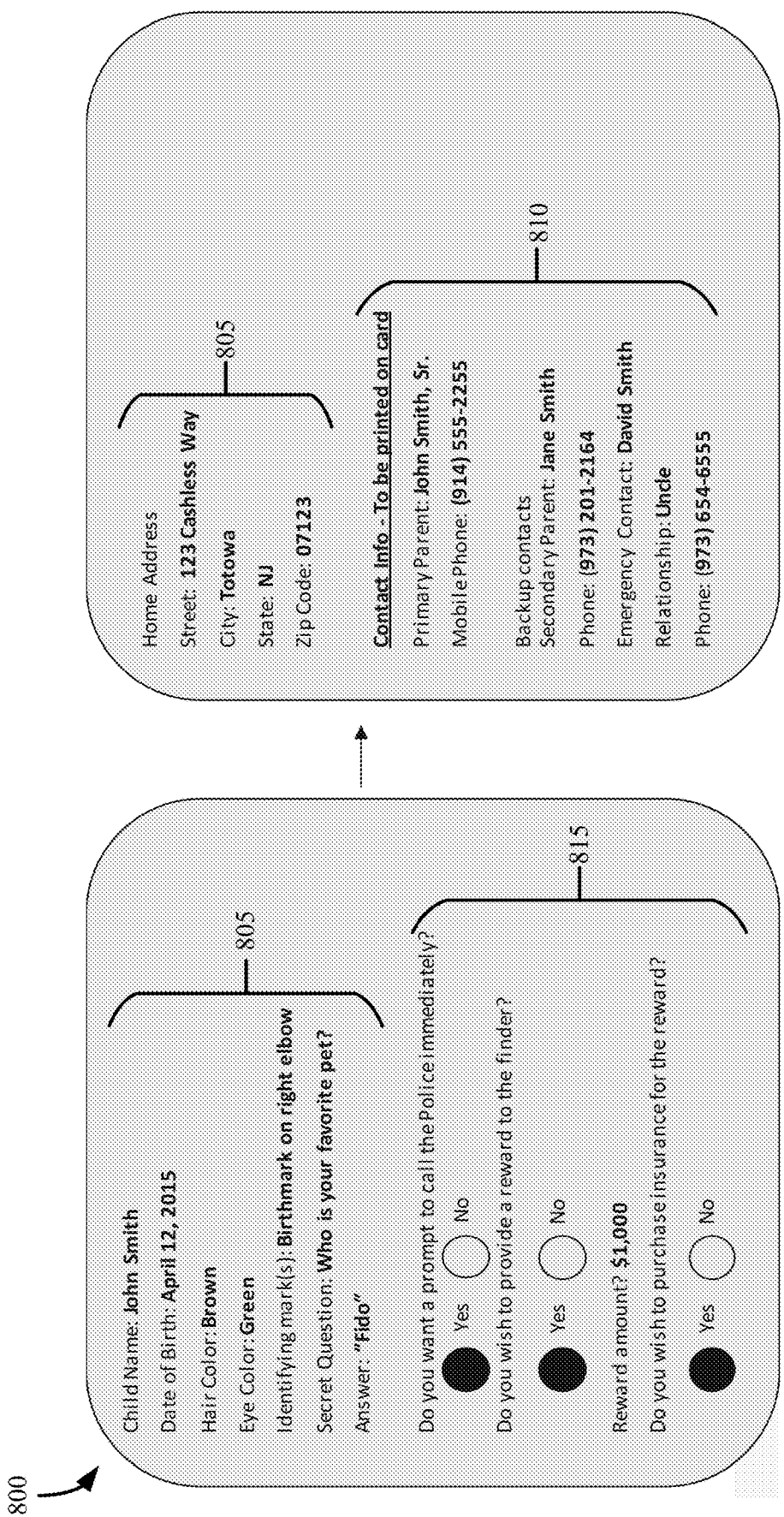
FIG. 8 illustrates an example missing entity enrollment profile according to an embodiment of the invention.

FIG. 7 illustrates an example missing entity enrollment process according to an embodiment of the invention; and FIG. 8 illustrates an example entity enrollment profile according to an embodiment of the invention.

Referring to FIGS. 7 and 8, a missing entity contact may enroll a missing entity for missing entity alert and retrieval through a missing entity enrollment process 700. In the illustrative example, a parent is enrolling a child for missing entity alert and retrieval.

To begin the missing entity enrollment process 700, the parent can register (710) the child's information with an issuer offering missing entity alert and retrieval. During registration, the parent can fill out an enrollment profile (e.g., child enrollment profile 800). The child enrollment profile 800 includes profile information such as, but not limited to, contact information (e.g., information for the missing entity 805 and information for the missing entity contact 810) and retrieval information 820.

In the illustrative example, the information for the missing entity 805 includes child name, date of birth, hair color, eye color, identifying mark(s), a secret question and answer, and a home address.

The information for the missing entity contact 810 can include contact information that may be printed on a missing entity card. In the illustrative example, the information for the missing entity contact 810 includes primary parent and mobile phone number of the primary parent, as well as backup contacts, such as secondary parent and emergency contact, relationship of the emergency contact to the missing entity, and phone number of the secondary parent and emergency contact.

In the illustrative example, the retrieval information 820 includes a police notification setting and rewards settings. The rewards settings include an amount of reward to provide for a finder and reward insurance.

It should be understood that more or fewer information may be collected during enrollment process.

Returning to the missing entity enrollment process 700, an issuer bank can issue and mail (720) a missing entity card to the parent. As previously discussed, the missing entity card may be issued with or without payment capabilities.

The parent can receive and activate (730) the missing entity card from the issuer. Then, depending on the age of the missing entity, the parent can either perform Step 740 or Step 750. For example, for a toddler or pre-school aged child, the parent may affix the missing entity card to the child before the child goes out in public, as shown in Step 740. In another example, for a grammar school aged child, the parent can digitize the missing entity card in the child's payment enabled wearable device, as shown in Step 750.

Figure 9:
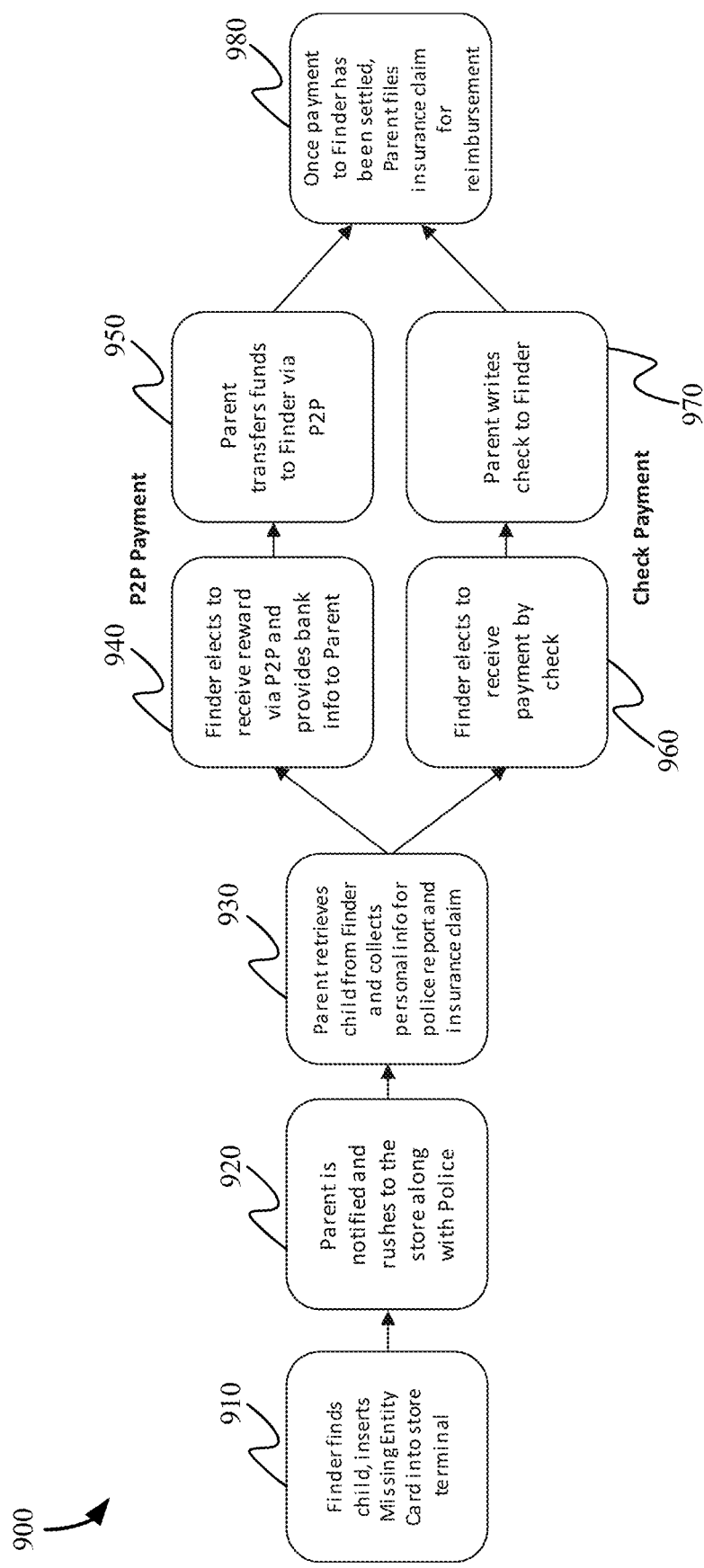
FIG. 9 illustrates an example missing entity retrieval and finder reward process flow according to an embodiment of the invention.

FIG. 9 illustrates an example missing entity retrieval and finder reward process flow according to an embodiment of the invention. Referring to FIG. 9, a missing entity may be found by a finder and retrieved by a missing entity contact, and the finder may be rewarded through a missing entity retrieval and finder reward process ("retrieval and reward process") 900. In the illustrative example of FIG. 9, the missing entity is a child carrying a missing entity card and the missing entity contact is a parent.

The retrieval and reward process 900 may by initiated when a finder finds the child and inserts the missing entity card into a merchant/store terminal (910). Once the retrieval and reward process 900 is initiated, the parent can be notified and can come to the store (possibly along with police) (920). The parent can retrieve the child from the finder and collect personal information from the finder for a police report, if needed, and insurance claim 930).

The finder can elect to receive the reward via a peer-to-peer (P2P) payment or a check payment. For example, the finder can elect to receive the reward via P2P and provide the parent with the finder's bank information (940). The parent can then transfer funds to the finder via P2P (950). In another example, the finder can elect to receive the reward by check (960). The parent can then write a check to the finder (970).

Once the payment to the finder for the reward has been settled, the parent can file an insurance claim for reimbursement (980).

In some cases, the insurance policy is offered by the issuer as part of the missing entity alert and retrieval service. In some cases, the issuer of the missing entity card may provide finder reward guidelines. For example, the issuer may require the parent to file police report including the finder personal information, regardless of whether police are dispatched to the scene. As another example, the issuer may require the parent to file an insurance claim that includes the finder personal information. As yet another example, the issuer may require a reward payment to the finder by issuer terms and conditions. As yet another example, the issuer may not allow a cash payment for the reward payment to the finder, in order to protect against insurance fraud.

Figure 10:
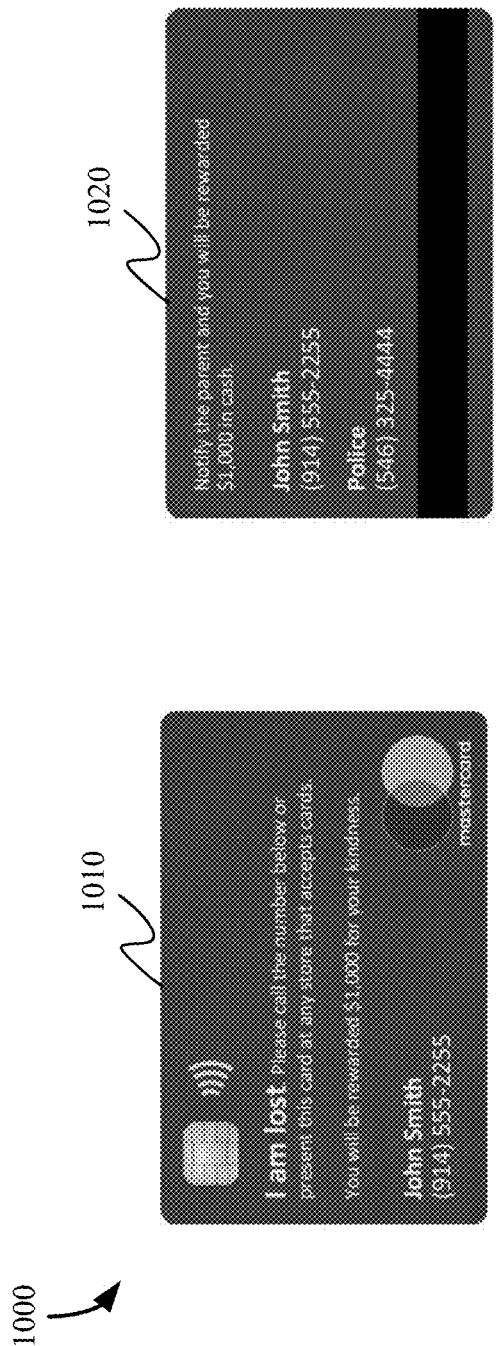
FIG. 10 illustrates an example missing entity card according to an embodiment of the invention.

FIG. 10 illustrates an example missing entity card according to an embodiment of the invention. In the illustrative example, both a front view 1010 and a back view 1020 of the missing entity card 1000 is shown.

The front view 1010 and the back view 1020 include a message with instructions for a finder of a missing entity carrying the missing entity card 1000, reward information, as well as contact information for the missing entity contact and police. In the illustrative example, the message instructs the finder to call the number for the missing entity contact or present the missing entity card 1000 at any store that accepts payment cards.

FIG. 11 illustrates components of a computing system that may be used in certain embodiments described herein. Referring to FIG. 11, system 1100 may be implemented within a single computing device or distributed across multiple computing devices or sub-systems that cooperate in executing program instructions. The system 1100 can include one or more blade server devices, standalone server devices, personal computers, routers, hubs, switches, bridges, firewall devices, intrusion detection devices, mainframe computers, network-attached storage devices, and other types of computing devices. The system hardware can be configured according to any suitable computer architectures such as a Symmetric Multi-Processing (SMP) architecture or a Non-Uniform Memory Access (NUMA) architecture.

The system 1100 can include a processing system 1110, which may include one or more processors and/or other circuitry that retrieves and executes software 1120 from storage system 1130. Processing system 1110 may be implemented within a single processing device but may also be distributed across multiple processing devices or sub-systems that cooperate in executing program instructions.

Storage system(s) 1130 can include any computer readable storage media readable by processing system 1110 and capable of storing software 1120. Storage system 1130 may be implemented as a single storage device but may also be implemented across multiple storage devices or sub-systems co-located or distributed relative to each other. Storage system 1130 may include additional elements, such as a controller, capable of communicating with processing system 1110. Storage system 1130 may also include storage devices and/or sub-systems on which data is stored. System 1100 may access one or more storage resources in order to access information to carry out any of the processes indicated by software 1120.

Software 1120, including routines for performing processes such as processes 200, 250, 580, and 600, depending on whether the system 1110 is implementing a missing entity system or a system that is part of a payment network with missing entity platform. Software 1120 may be implemented in program instructions and among other functions may, when executed by system 1100 in general or processing system 1110 in particular, direct the system 1100 or processing system 1110 to operate as described herein.

In embodiments where the system 1100 includes multiple computing devices, the server can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

A communication interface 1140 may be included, providing communication connections and devices that allow for communication between system 1100 and other computing systems (not shown) over a communication network or collection of networks (not shown) or the air.

In some embodiments, system 1100 may host one or more virtual machines.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

It should be understood that as used herein, in no case do the terms "storage media," "computer-readable storage media" or "computer-readable storage medium" consist of transitory carrier waves or propagating signals. Instead, "storage" media refers to non-transitory media.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. One or more computer-readable storage media having instructions stored thereon that when executed by a processor, direct a system to:
   receive, from a conventional payment network, a conventional transaction request intended for an issuer for a transaction comprising missing entity account information and merchant information, the conventional transaction request being an authorization request requesting authorization of the transaction or a preauthorization request requesting preauthorization of the transaction;
   determine that the transaction is a missing entity transaction based on the missing entity account information and a type of the transaction;
   in response to determining the transaction is the missing entity transaction, obtain contact information for a missing entity contact associated with the missing entity account information;
   package, by a messaging application of a message channel system, the merchant information into a missing entity alert; and
   communicate, by the messaging application of the message channel system, the missing entity alert to the missing entity contact using the obtained contact information.

2. The media of claim 1, wherein the instructions to obtain the contact information direct the system to:
   communicate with a contacts data resource to obtain the contact information for the missing entity contact associated with the missing entity account information.

3. The media of claim 1, wherein the merchant information comprises a merchant name, a merchant location, merchant contact information, or a combination thereof.

4. The media of claim 1, wherein the missing entity account information comprises an account number, a name of a missing entity, or a combination thereof.

5. The media of claim 1, wherein the contact information comprises a missing entity contact name, a missing entity contact email address, a missing entity contact phone number, or a combination thereof.

6. The media of claim 1, wherein the messaging application is a phone application, a simple messaging service (SMS) application, a multimedia messaging service (MMS) application, an email application, or an instant messaging application.

7. A computer implemented method comprising:
   receiving, at a computing system, a conventional transaction request intended for an issuer for a transaction comprising missing entity account information and merchant information, the conventional transaction request being an authorization request requesting authorization of the transaction or a preauthorization request requesting preauthorization of the transaction;
   determining that the transaction is a missing entity transaction based on the missing entity account information and a type of the transaction;
   in response to determining the transaction is the missing entity transaction, obtaining contact information for a missing entity contact associated with the missing entity account information;
   packaging, by a messaging application of a message channel system, the merchant information into a missing entity alert; and
   communicating, by the messaging application of the message channel system, the missing entity alert to the missing entity contact using the obtained contact information.

8. The method of claim 7, wherein obtaining the contact information comprises communicating with a contacts data resource to obtain the contact information for the missing entity contact associated with the missing entity account information.

9. The method of claim 7, wherein the merchant information comprises a merchant name, a merchant location, merchant contact information, or a combination thereof.

10. The method of claim 7, wherein the missing entity account information comprises an account number, a name of a missing entity, or a combination thereof.

11. The method of claim 7, wherein the messaging application is a phone application, a simple messaging service (SMS) application, a multimedia messaging service (MMS) application, an email application, or an instant messaging application.

12. The method of claim 7, wherein the contact information comprises a missing entity contact name, a missing entity contact email address, a missing entity contact phone number, or a combination thereof.

13. The method of claim 7, wherein the transaction request is received from a conventional payment network.

14. The method of claim 7, wherein determining if the transaction is the missing entity transaction comprises identifying if the missing entity account information is associated with payment capabilities.

15. The method of claim 7, wherein determining if the transaction is the missing entity transaction comprises identifying if the type of the transaction is a $1 preauthorization transaction.

16. A computing device comprising:
a processor;
a storage device; and
instructions stored in the storage device that when executed by the processor, direct the computing device to:
receive, from a conventional payment network, a conventional transaction request intended for an issuer for a transaction comprising missing entity account information and merchant information, the conventional transaction request being an authorization request requesting authorization of the transaction or a preauthorization request requesting preauthorization of the transaction;
obtain contact information for a missing entity contact associated with the missing entity account information;
package, by a messaging application of a message channel system, the merchant information into a missing entity alert; and
communicate, by the messaging application of the message channel system, the missing entity alert to the missing entity contact using the obtained contact information.

17. The computing device of claim 16, wherein the transaction is payment transaction, a $1 pre-authorization transaction, or a missing entity transaction.

18. The computing device of claim 16, wherein the instructions to obtain the contact information for the missing entity contact associated with the missing entity account information direct the computing device to communicate with a contacts data resource to obtain the contact information for the missing entity contact associated with the missing entity account information, the missing entity account information comprising an account number, a name of a missing entity, or a combination thereof.

19. The computing device of claim 16, wherein the missing entity alert is an API call comprising the missing entity account information and the merchant information.

* * * * *